US008681346B2

(12) United States Patent
Ruiz et al.

(10) Patent No.: US 8,681,346 B2
(45) Date of Patent: Mar. 25, 2014

(54) MAXIMIZE PRINTER COMPONENT LIFE USING INCOMING MEDIA AND IMAGE DATA

(75) Inventors: Erwin Ruiz, Rochester, NY (US); Julie M. Hanfland, Pittsford, NY (US); Melissa A. Monahan, Rochester, NY (US); John E. Derimiggio, Fairport, NY (US); Steven M. Russel, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 612 days.

(21) Appl. No.: 13/036,281

(22) Filed: Feb. 28, 2011

(65) Prior Publication Data

US 2012/0219339 A1 Aug. 30, 2012

(51) Int. Cl.

| | |
|---|---|
| ***G06F 15/00*** | (2006.01) |
| ***G06F 3/12*** | (2006.01) |
| ***G06K 1/00*** | (2006.01) |

(52) U.S. Cl.

USPC .......................................... 358/1.1; 358/1.13

(58) Field of Classification Search

None

See application file for complete search history.

(56) References Cited

U.S. PATENT DOCUMENTS

| | | | | |
|---|---|---|---|---|
| 5,491,540 | A | 2/1996 | Hirst | |
| 6,032,004 | A | 2/2000 | Mirabella, Jr. et al. | |
| 6,633,732 | B2 | 10/2003 | Siegel et al. | |
| 7,283,777 | B2 | 10/2007 | Russel et al. | |
| 8,375,215 | B2 * | 2/2013 | Powers et al. | 713/176 |
| 2003/0123077 | A1 | 7/2003 | Siegel et al. | |
| 2006/0025967 | A1 | 2/2006 | Furno et al. | |

* cited by examiner

*Primary Examiner* — Douglas Tran

(74) *Attorney, Agent, or Firm* — Gibb & Riley, LLC

(57) ABSTRACT

A method and structure of automatically selecting replacement components for a printing machine automatically maintains media type statistics on media types used for printing in the printing machine for a period of time, and automatically recommends a replacement for a worn component with one of a plurality of interchangeable different-type replacement components based on the media type statistics. The interchangeable different-type replacement components have different performance characteristics for each of the media types, and the interchangeable different-type replacement components perform the same function as said worn component within the printing machine.

20 Claims, 4 Drawing Sheets

MAXIMIZE PRINTER COMPONENT LIFE USING INCOMING MEDIA AND IMAGE DATA

BACKGROUND

Embodiments herein generally relate to printing devices and methods, and more particularly to methods and devices that maximize printer component life by selecting among interchangeable replacement components depending upon incoming media and image data that a specific printing machine experiences.

Printing devices are complex machines that consume products (including marking material (inks, toners, etc.) and media (sheets of media (paper, transparencies, etc.), rolls of media, etc.)) and that wear out components (e.g., rollers, fusers, belts, etc.). Additionally, the internal and external processes within printing devices can create environmental conditions that have excessive amounts of debris. Such debris can detrimentally affect the ability of the printing components to operate properly.

The utilization and replacement of such products and components during a printing device's lifetime can substantially alter the cost per print, the image quality, and the overall user satisfaction. Therefore, systems, devices, and methods that improve upon the ability to properly plan for and recommend replacement products and components are highly beneficial.

SUMMARY

This disclosure presents various processes that track and generate media usage demographic patterns in combination with image area coverage in order to select ideal components or component combinations according to machine usage. The embodiments herein reduce subjectivity in the component selection recommendation thereby minimizing selection of the wrong replacement component, such that the machine overall cost benefit is maximized.

Exemplary methods herein automatically select replacement components for a printing machine. Such methods receive media type input as unprinted media is supplied to the printing machine using a sensor or user input. The methods automatically (using a computer-readable storage device in the printing machine) maintain media type statistics on media types used for printing in the printing machine for a period of time, based on the media type input, and automatically maintain image area coverage statistics of print jobs processed by the printing machine for the period of time. This period of time, can be, for example the period of time between service intervals of the printing machine, or can be other predetermined or dynamic periods.

Then, the methods automatically (using a computerized device operatively connected to the computer-readable storage device) identify the most used media type based on the media type statistics, and identify an image area coverage amount, based on the image area coverage statistics. These different media types can comprise a relatively rough media type and relatively smooth media type.

Again using the computerized device, the methods herein automatically recommend a replacement for a worn component with one of a plurality of interchangeable different-type replacement components appropriate for the most used media type. The interchangeable different-type replacement components have different performance characteristics for each of the media types, and the interchangeable different-type replacement components perform the same function within the printing machine.

Some of the interchangeable different-type replacement components are more resistant to wear than other interchangeable different-type replacement components. Similarly, some of the interchangeable different-type replacement components are more resistant to contamination than other interchangeable different-type replacement components.

Exemplary printing machines herein include at least one processor, at least one computer-readable storage device and at least one graphic user interface operatively connected to the processor. The exemplary printing machines also include at least one media storage tray that has at least one sensor operatively connected to the processor.

The processor receives media type input as unprinted media is supplied to the media storage tray through the media tray sensor or user input into the graphic user interface. The processor automatically (using the computer-readable storage device in the printing machine) maintains media type statistics on media types used for printing in the printing machine for a period of time, based on the media type input.

Then, the processor can automatically recommend a replacement for a worn component with one of a plurality of interchangeable different-type replacement components appropriate for the most used media type. The interchangeable different-type replacement components have different performance characteristics for each of the media types, and the interchangeable different-type replacement components perform the same function within the printing machine.

The embodiments herein maintain automated statistics on media type and job demographics and use such statistics with rules and local historical data to learn and specify the optimal alternative replacement component, as well as to adjust service intervals per component based on implied machine conditions such as contamination level.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, systems, devices, and methods that improve upon the ability to properly plan for and recommend replacement products and components are highly beneficial.

In high production color presses, the useful lives of some of the components can be media and image dependant. The diverse media and image range can generate different failure modes depending on how the print jobs are set up. Each of these failure modes can determine the potential life expectation for some of the more costly components within the fuser assembly such as the fuser roll, the external heat roll and the web cassette.

In order to minimize the detrimental impacts of component failures, engineers can tailor a component's design for a predicted environment. For example, engineers can tailor a fuser roll coating formulation to be more robust against some primary failure modes, such as contamination or wear. Engineers can also combine alternative designs to extend the components life. Also, it may be possible to use a lower cost component that may perform adequate enough for the application.

In order to determine which component will function the best for a customer that runs certain media, prior to the development of the present methods, devices and systems, engineers would have to formulate a recommendation of which interchangeable component is the most appropriate for that particular machine based on their own knowledge. However, this recommendation may be very subjective, and can also change according to customers' business needs. The potential use of a less desirable interchangeable component can greatly affect the component's useful life and may lead to increased costs. This scenario applies to several printing machine components, such as the fusing assembly, including the fuser roll, web cassette, and not having the optimal high service frequency interval (HSFI), etc. Thus, proper component selection drives the overall component life and eventually reduces or improves the overall cost per print.

For example, a printing machine that runs mostly smooth/coated media will generate more fuser roll contamination, but a machine that runs mostly rough uncoated media will wear the fuser roll surfaces more because non-coated paper wears the fuser roll surface more than uncoated media.

Figure 1:
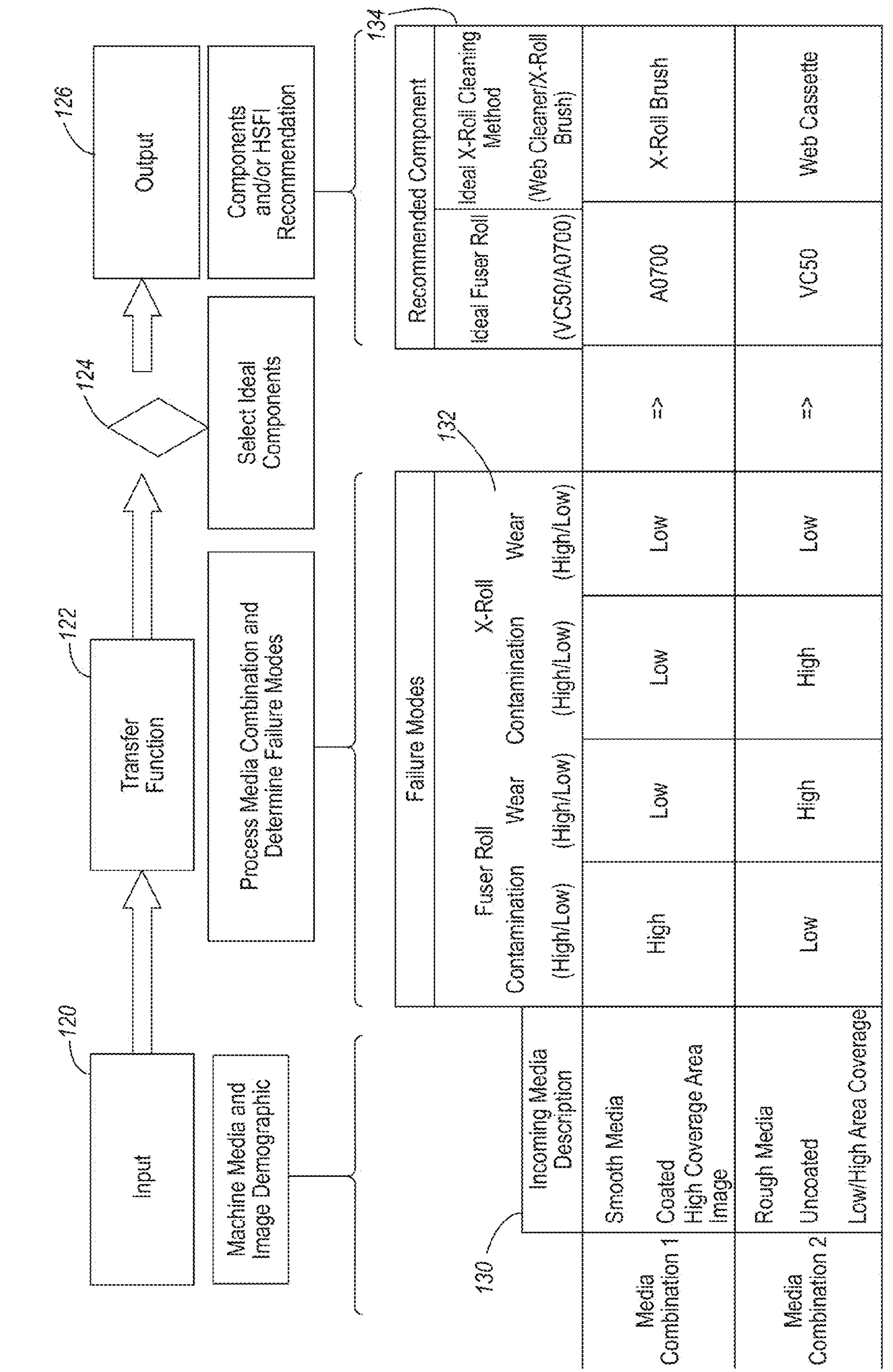
FIG. 1 is a flow diagram illustrating the operations of various embodiments herein.

Thus, as shown in flowchart form in FIG. 1, in the input portion of the method 120, various exemplary embodiments herein track the machine jobs and will create a statistical demographic (data). The statistical demographic is based on the media type (monitored using, for example, a demographic data logger) and the image coverage area. Thus, for example, as shown in item 130, a first type of media combination that is be supplied predominately to a specific printing machine could be media combination 1, which is smooth media, that is coated, and that is used in an image area that has high coverage. Another media combination could be media combination 2, which is an example that has rough media, is uncoated, and can have a high or low area of image coverage. As would be understood by those ordinarily skilled in the art, many other combinations of media characteristics could be supplied to a specific printing device, and item 120 is used to track such media types and image area coverage to maintain the statistical information.

In the transfer function process 122, the methods process the media combinations through various rules in order to determine failure modes. This processes the statistical demographic data through, for example, a failure mode transfer function (which could be based on various rules) to determine, for example, the contamination and wear of various printing device components (based on the types of media and image coverage areas that have been input to the printing machine).

For example, as shown in item 132, various failure mode functions (which could be based on various rules) could relate to a fuser roll or an external heat roll and could operate to predict contamination and wear of such items based on high and low usage amounts of media combination 1 or media combination 2.

In item 124, the process selects ideal components based on the predicted amount of contamination and wear on the different components (e.g., the fuser roll or external heat roll). This process selects which component(s) are more robust against the actual machine failure modes.

In item 126, the process outputs its recommendation (which can be specific printing components and/or HSFI recommendations). Thus, this process can use the transfer function 122 to determine optimized HSFI interval values. For example, as shown in item 134 the methods and systems herein can recommend the ideal fuser roll (between model numbers VC50 and A0700) or ideal external heat roll cleaning method (between a web cleaner and a brush).

Thus, the methods and systems recommend the right component to the operator in order to maximize part use and minimize the cost per copy. The processes herein can reset HSFI values base on machine usage (where a highly contaminated machine may affect external heat roll life more than low contaminated machines); while current external heat roll components have a fixed HSFI value.

Further, the methods and systems herein can recommend that various assemblies be combined based on the media and image demographic analysis. Thus, for example, an external heat roll brush can be used to reduce costs per copy for machines that run with low contamination (avoiding the need to use a more expensive web cassette). Additionally, one type of external heat roll may be used in place of another if that type of external heat roll is more easily contaminated than the other types.

With embodiments herein, there is no need to rely on a service engineer for a recommendation, which could be different month by month, or which could be different from service engineer to service engineer.

Further, the machine demographic produced could be used to set printing machines for specific long print jobs that occur with some regularity. For example, various components could be utilized for repeated long jobs where the system is running a specific job each month that uses coated documents. The processes herein can determine which components are more optimal for those specific periodic long jobs. The recommendations may have different resolutions for specific repeated long jobs based on job cycle per months or an average usage.

Figure 2:
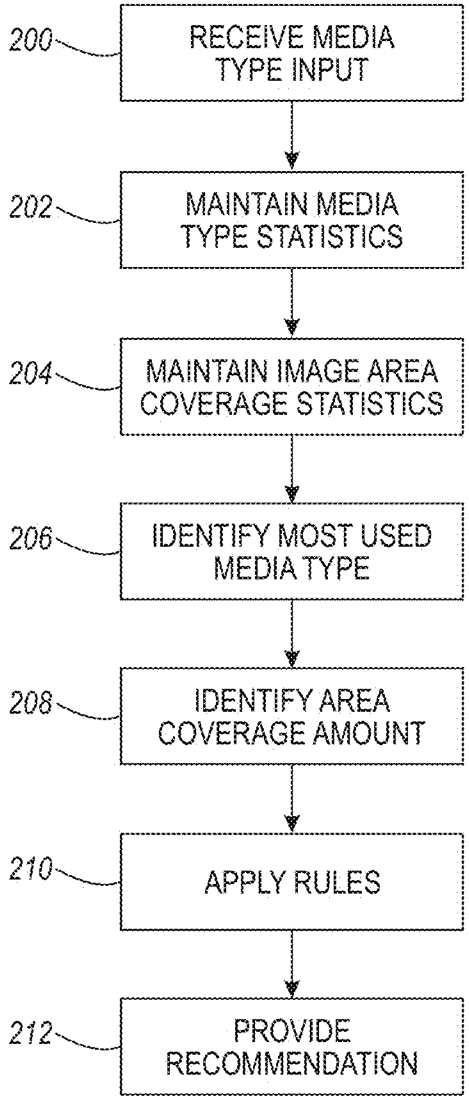
FIG. 2 is a flow diagram illustrating the operations of various embodiments herein.

Therefore, the embodiments herein automatically select replacement components for a printing machine, as shown in flowchart form in FIG. 2. Automatically means that the processing is performed by a machine without further user input. Such methods receive media type input as unprinted media is supplied to the printing machine using a sensor or user input in item 200. These different media types can comprise a relatively rough media type and relatively smooth media type.

For example, the type of media being supplied can be automatically detected by reading computer-readable markings (e.g., bar codes, glyphs, etc.) from packaging of the input blank sheets of media, sensors can detect the smoothness or roughness of the input blank sheets of media can, or sensors can detect the weight and size of the media, etc., as the media is fed into the printing machine or as the media is placed in the media tray. Similarly, the user can input the media type through the graphic user interface, through a network connection, by scanning preset computer-readable codes, etc.

The methods automatically (using a computer-readable storage device in the printing machine) maintain media type statistics on media types used for printing in the printing machine for a period of time (202), based on the media type input, and automatically maintain image area coverage statistics of print jobs processed by the printing machine for the period of time (204). This period of time, can be, for example the period of time between service intervals of the printing machine, or can be other predetermined or dynamic periods. The statistics that are maintained can be simple totals, averages, etc., up to more complex statistical measures including trends, data groupings, etc.

Then, the methods automatically (using a computerized device operatively connected to the computer-readable storage device) identify the most used media type based on the media type statistics (206), and identify a predominate image area coverage amount, based on the image area coverage statistics (208). The image area coverage amount can similarly by a value (a total, an average, a statistical measure, etc.) that indicates the relative amount of imaging (in terms of area) that the printer has performed over the time period.

Again using the computerized device, the methods herein automatically apply rules and functions (210) to provide a recommendation (212) that, as discussed above, can be a recommendation for a replacement for a worn component with one of a plurality of interchangeable different-type replacement components appropriate for the most used media type. Additionally, the recommendation can also be optimized service interval values and such service intervals can be automatically reset within the printing machine depending upon the recommendations made herein.

The interchangeable different-type replacement components have different performance characteristics for each of the media types, yet the interchangeable different-type replacement components perform the same function as the worn component within the printing machine. In other words, there may be 10 different types of fusers that could operate within a given printing device; however, each different type of fuser may have different costs, different wear abilities, different contamination abilities, etc. The embodiments herein select one of these as an optimal component to replace the exhausted (worn) fuser.

Thus, some of the interchangeable different-type replacement components are more resistant to wear than other interchangeable different-type replacement components. Similarly, some of the interchangeable different-type replacement components are more resistant to contamination than other interchangeable different-type replacement components.

Figure 3:
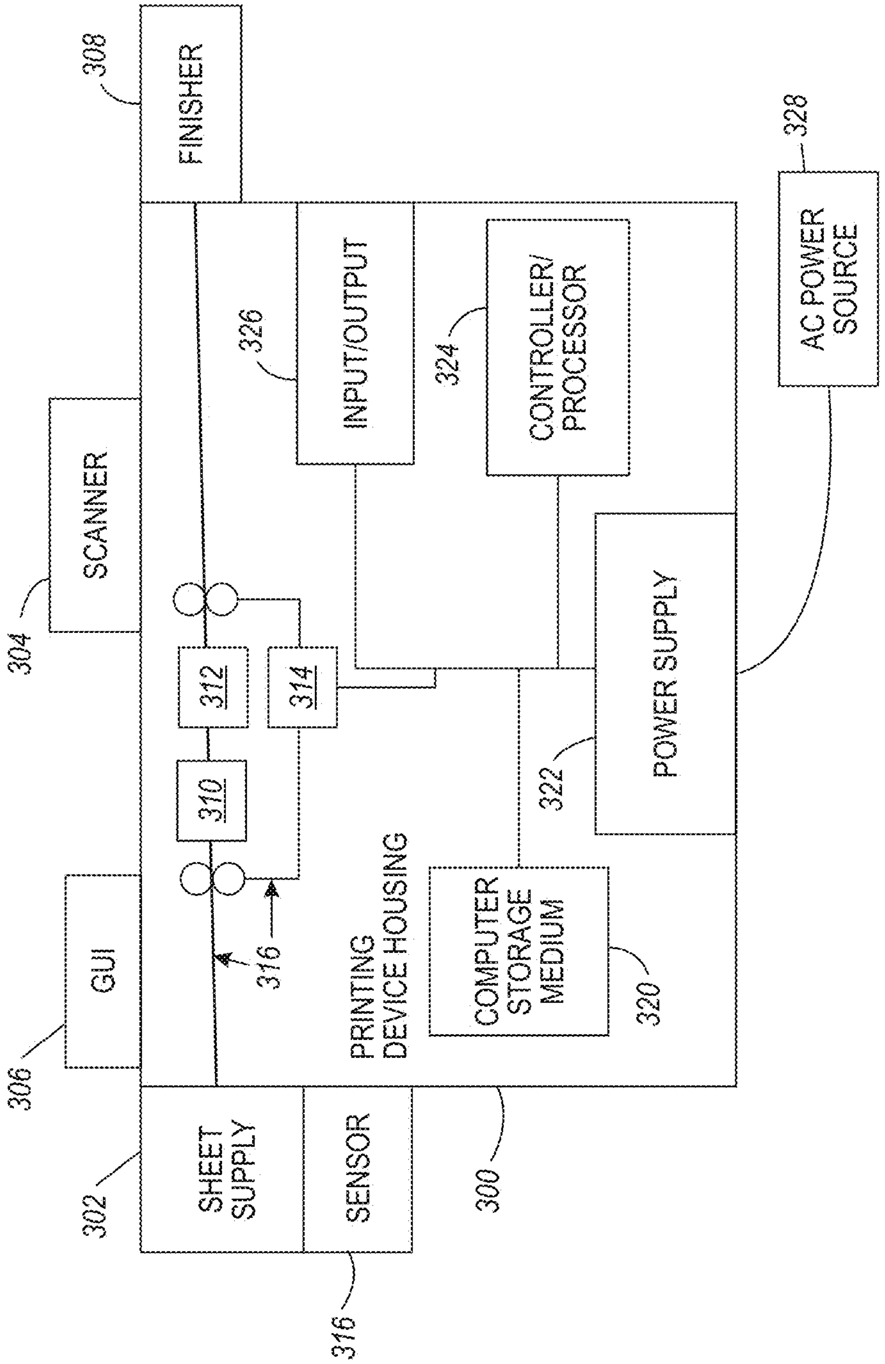
FIG. 3 is a side-view schematic diagram of a device according to embodiments herein.

FIG. 3 illustrates a computerized printing device 300, which can be used with embodiments herein and can comprise, for example, a printer, copier, multi-function machine, etc. The printing device 300 includes a controller/processor 324, at least one marking device (printing engine) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components.

As would be understood by those ordinarily skilled in the art, the printing device 300 shown in FIG. 3 is only one example and the embodiments herein are equally applicable to other types of printing devices that may include less components or more components. For example, while a limited number of printing engines and paper paths are illustrated in FIG. 3, those ordinarily skilled in the art would understand that many more paper paths and additional printing engines could be included within any printing device used with embodiments herein.

In such a computerized (printing) device 300, the processor 324 receives media type input as unprinted media is supplied to the media storage tray 302 through the media tray sensor 316 or user input into the graphic user interface 306. The processor 324 automatically (using the computer-readable storage device 320 in the printing machine 300) maintains media type statistics on media types used for printing in the printing machine for a period of time, based on the media type input, and automatically maintains image area coverage statistics of print jobs processed by the printing machine for the period of time.

Then, the processor 324 automatically (using a computerized device operatively connected to the computer-readable storage device) identifies the most used media type based on the media type statistics, and identifies an image area coverage amount, based on the image area coverage statistics. Again, these different media types can comprise a relatively rough media type and relatively smooth media type.

Then, the processor 324 can automatically recommend a replacement for a worn component with one of a plurality of interchangeable different-type replacement components appropriate for the most used media type. The interchangeable different-type replacement components have different performance characteristics for each of the media types, and the interchangeable different-type replacement components perform the same function within the printing machine.

Figure 4:
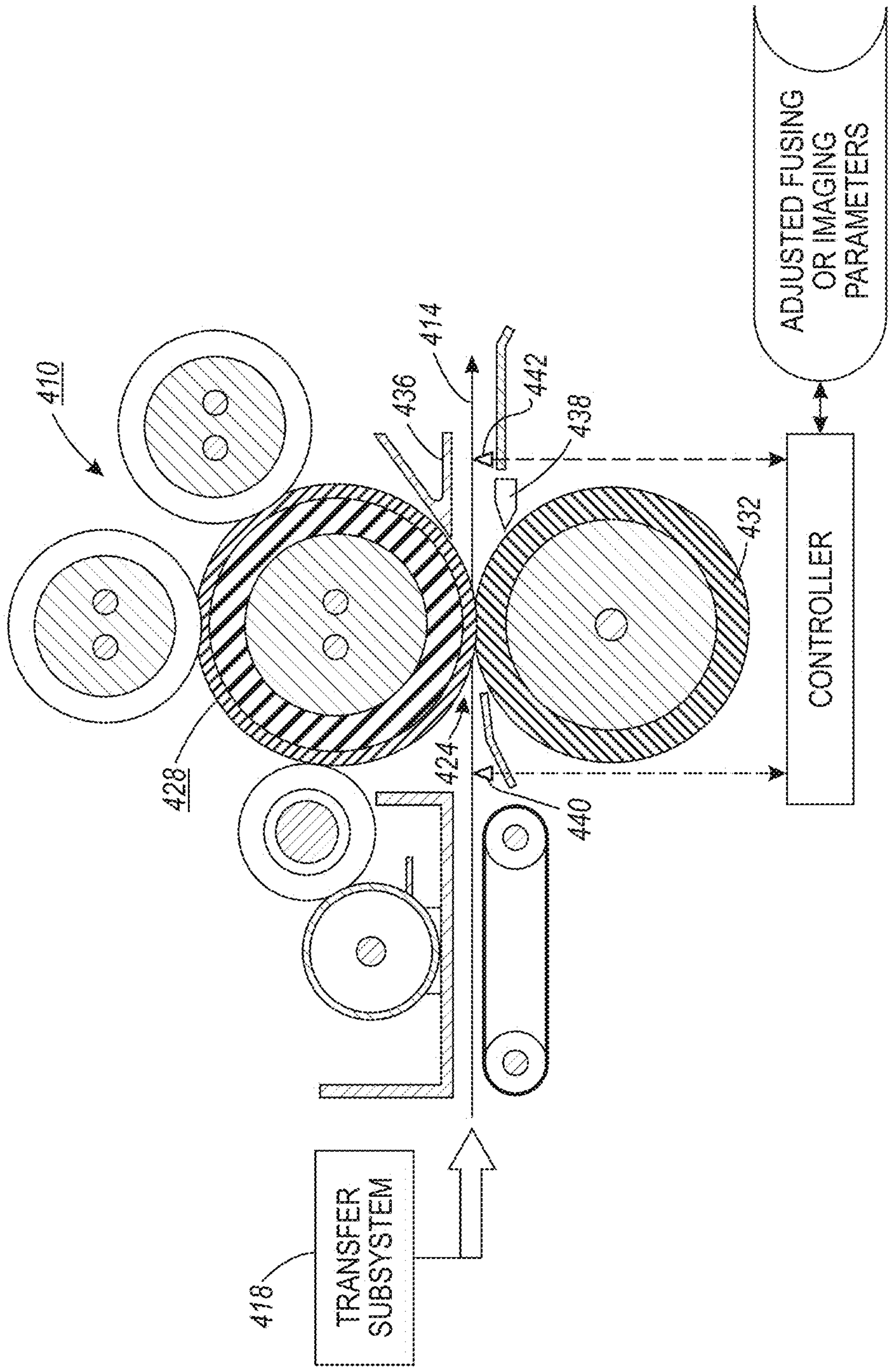
FIG. 4 is a side-view schematic diagram of a device used with embodiments herein.

There are many components that may experience wear and/or contamination. For example, FIG. 4 illustrates some exemplary components including a fusing subsystem 410. The subsystem 410 can be located in a paper path generally depicted by arrow 414. In such a system, a substrate sheet travels along the path from a prior subsystem (e.g., transfer subsystem 418) and is advanced to nip 424, formed between a fuser roll 428 and a backing or pressure roll 432, one or both of which are driven at a speed regulated by a controller 324 so that the outer surfaces thereof rotate at approximately the same speed as the incoming substrate sheet. The structure can further include an air-knife 436, stripping fingers 438 or the like located in the post-nip region. Typically, the flow of the substrate sheet into and out of the nip is detected by jam detection sensors 440 and 442, respectively. While a few components that experience wear and contamination are illustrated in FIG. 4, those ordinarily skilled in the art would understand that different machines that can be used with embodiments herein may include many more (or less) components and that FIG. 4 is merely one of many examples.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method of automatically selecting replacement components for a printing machine, said method comprising:

automatically, using a computer-readable storage device in said printing machine, maintaining media type statistics on media types used for printing in said printing machine for a period of time; and automatically, using a computerized device operatively connected to said computer-readable storage device, recommending a replacement for a worn component with one of a plurality of interchangeable different-type replacement components based on said media type statistics, said interchangeable different-type replacement components having different performance characteristics for each of said media types, and said interchangeable different-type replacement components performing the same function as said worn component within said printing machine.

2. The method according to claim 1, a first of said interchangeable different-type replacement components being more resistant to wear than a second of said interchangeable different-type replacement components.

3. The method according to claim 1, a first of said interchangeable different-type replacement components being more resistant to contamination than a second of said interchangeable different-type replacement components.

4. The method according to claim 1, said period of time being a period of time between service intervals of said printing machine.

5. The method according to claim 1, said media types comprising a relatively rough media type and relatively smooth media type.

6. A method of automatically selecting replacement components for a printing machine, said method comprising:

receiving media type input as unprinted media is supplied to said printing machine using one of a sensor and user input;

automatically, using a computer-readable storage device in said printing machine, maintaining media type statistics on media types used for printing in said printing machine for a period of time based on said media type input;

automatically, using a computer-readable storage device in said printing machine, maintaining image area coverage statistics of print jobs processed by said printing machine for said period of time;

automatically, using a computerized device operatively connected to said computer-readable storage device, identifying a most used media type based on said media type statistics and identifying an image area coverage amount, based on said image area coverage statistics; and automatically, using said computerized device, recommending a replacement for a worn component with one of a plurality of interchangeable different-type replacement components appropriate for said most used media type, said interchangeable different-type replacement components having different performance characteristics for each of said media types, and said interchangeable different-type replacement components performing the same function as said worn component within said printing machine.

7. The method according to claim 6, a first of said interchangeable different-type replacement components being more resistant to wear than a second of said interchangeable different-type replacement components.

8. The method according to claim 6, a first of said interchangeable different-type replacement components being more resistant to contamination than a second of said interchangeable different-type replacement components.

9. The method according to claim 6, said period of time being a period of time between service intervals of said printing machine.

10. The method according to claim 6, said media types comprising a relatively rough media type and relatively smooth media type.

11. A printing machine comprising:

at least one processor;

at least one computer-readable storage device operatively connected to said processor;

at least one graphic user interface operatively connected to said processor;

at least one media storage tray having at least one sensor operatively connected to said processor, said processor receiving media type input as unprinted media is supplied to said media storage tray through one of said sensor and user input into said graphic user interface;

said processor automatically, using said computer-readable storage device in said printing machine, maintaining media type statistics on media types used for printing in said printing machine for a period of time based on said media type input;

said processor automatically identifying a most used media type based on said media type statistics; and said processor automatically recommending a replacement for a worn component with one of a plurality of interchangeable different-type replacement components appropriate for said most used media type, said interchangeable different-type replacement components having different performance characteristics for each of said media types, and said interchangeable different-type replacement components performing the same function as said worn component within said printing machine.

12. The printing machine according to claim 11, a first of said interchangeable different-type replacement components being more resistant to wear than a second of said interchangeable different-type replacement components.

13. The printing machine according to claim 11, a first of said interchangeable different-type replacement components being more resistant to contamination than a second of said interchangeable different-type replacement components.

14. The printing machine according to claim 11, said period of time being a period of time between service intervals of said printing machine.

15. The printing machine according to claim 11, said media types comprising a relatively rough media type and relatively smooth media type.

16. A computer-readable storage device comprising a non-transitory computer-readable storage medium storing instructions executable by a computerized device, said instructions causing said computerized device to perform a method of automatically selecting replacement components for a printing machine, said method comprising:

automatically maintaining media type statistics on media types used for printing in said printing machine for a period of time; and automatically recommending a replacement for a worn component with one of a plurality of interchangeable different-type replacement components based on said media type statistics, said interchangeable different-type replacement components having different performance characteristics for each of said media types, and said interchangeable different-type replacement components performing the same function as said worn component within said printing machine.

17. The computer-readable storage device according to claim 16, a first of said interchangeable different-type replacement components being more resistant to wear than a second of said interchangeable different-type replacement components.

18. The computer-readable storage device according to claim 16, a first of said interchangeable different-type replacement components being more resistant to contamination than a second of said interchangeable different-type replacement components.

19. The computer-readable storage device according to claim 16, said period of time being a period of time between service intervals of said printing machine.

20. The computer-readable storage device according to claim 16, said media types comprising a relatively rough media type and relatively smooth media type.

* * * * *